US007778864B2

(12) United States Patent
Conrad et al.

(10) Patent No.: US 7,778,864 B2
(45) Date of Patent: Aug. 17, 2010

(54) SYSTEM AND METHOD FOR IDENTIFYING SOURCING EVENT METRICS FOR ANALYZING A SUPPLIER

(75) Inventors: Michelle Conrad, San Ramon, CA (US); Joanna Dakes, Tucson, AZ (US); Daniel Velasquez, W Syracuse, UT (US)

(73) Assignee: Oracle International Corporation, Redwood Shores, CA (US)

( * ) Notice: Subject to any disclaimer, the term of this patent is extended or adjusted under 35 U.S.C. 154(b) by 1638 days.

(21) Appl. No.: 10/320,941

(22) Filed: Dec. 16, 2002

(65) Prior Publication Data

US 2004/0117242 A1 Jun. 17, 2004

(51) Int. Cl.
G06F 11/34 (2006.01)
(52) U.S. Cl. ....................................................... 705/11
(58) Field of Classification Search .................... 705/11
See application file for complete search history.

(56) References Cited

U.S. PATENT DOCUMENTS

| 5,734,890 | A | * | 3/1998 | Case et al. ...................... 707/5 |
| 5,765,138 | A | * | 6/1998 | Aycock et al. .................. 705/7 |
| 6,356,909 | B1 | * | 3/2002 | Spencer ....................... 707/10 |
| 6,647,374 | B2 | * | 11/2003 | Kansal ......................... 705/37 |
| 6,714,933 | B2 | * | 3/2004 | Musgrove et al. ............. 707/10 |
| 6,728,695 | B1 | * | 4/2004 | Pathria et al. .................. 707/2 |
| 6,871,181 | B2 | * | 3/2005 | Kansal .......................... 705/4 |
| 7,020,616 | B1 | * | 3/2006 | Mabuchi et al. ................ 705/7 |
| 7,047,208 | B1 | * | 5/2006 | Nelson et al. ................. 705/10 |
| 7,072,857 | B1 | * | 7/2006 | Calonge ...................... 705/26 |
| 7,110,976 | B2 | * | 9/2006 | Heimermann et al. ......... 705/37 |
| 7,165,036 | B2 | * | 1/2007 | Kruk et al. ..................... 705/1 |
| 7,284,204 | B2 | * | 10/2007 | Lee ............................ 715/764 |
| 7,353,239 | B2 | * | 4/2008 | Allard ............................. 1/1 |
| 7,437,309 | B2 | * | 10/2008 | Magrino et al. ................ 705/11 |
| 7,440,991 | B2 | * | 10/2008 | Sasaki et al. ................. 708/710 |
| 7,593,885 | B2 | * | 9/2009 | Du Preez et al. .............. 705/37 |
| 7,672,883 | B2 | * | 3/2010 | Harford et al. ................ 705/35 |
| 2001/0051913 | A1 | * | 12/2001 | Vashistha et al. ............. 705/37 |

(Continued)

FOREIGN PATENT DOCUMENTS

WO WO 9524687 A1 * 9/1995

(Continued)

OTHER PUBLICATIONS

Porter-Roth, Bud, Choosing A Vendor Inform, vol. 1, No. 13, Jan. 1999.*

(Continued)

*Primary Examiner*—Scott L Jarrett
(74) *Attorney, Agent, or Firm*—Townsend and Townsend and Crew, LLP

(57) ABSTRACT

A system and method for identifying sourcing event metrics for analyzing a supplier are disclosed. A consumer solicits bids from a supplier desiring to provide goods, services, etc., by creating an event that poses queries to the supplier. The consumer can create the event and queries associated therewith by selecting from predefined events, having predefined queries. Further, predefined criteria and parameters associated with the queries may also be associated with predefined events. The criteria and parameters are designed to measure the supplier's responses to the queries and the consumer can rate the supplier based on the supplier's responses according to the predefined criteria and parameters established by the consumer.

18 Claims, 6 Drawing Sheets

U.S. PATENT DOCUMENTS

| | | | |
|---|---|---|---|
| 2002/0042755 A1* | 4/2002 | Kumar et al. | 705/26 |
| 2002/0046147 A1* | 4/2002 | Livesay et al. | 705/37 |
| 2002/0178077 A1* | 11/2002 | Katz et al. | 705/26 |
| 2003/0023499 A1* | 1/2003 | Das et al. | 705/26 |
| 2003/0050865 A1* | 3/2003 | Dutta et al. | 705/27 |
| 2003/0115080 A1* | 6/2003 | Kasravi et al. | 705/1 |
| 2003/0120477 A1* | 6/2003 | Kruk et al. | 704/2 |
| 2003/0120504 A1* | 6/2003 | Kruk et al. | 705/1 |
| 2003/0120528 A1* | 6/2003 | Kruk et al. | 705/7 |
| 2003/0130878 A1* | 7/2003 | Kruk et al. | 705/7 |
| 2003/0184588 A1* | 10/2003 | Lee | 345/772 |
| 2003/0200168 A1* | 10/2003 | Cullen et al. | 705/37 |
| 2007/0130059 A1* | 6/2007 | Lee et al. | 705/37 |

FOREIGN PATENT DOCUMENTS

| | | |
|---|---|---|
| WO | WO 01/31485 A2 * | 5/2001 |

OTHER PUBLICATIONS

Weber, Charles Arthur, A decision support system using multicriteria techniques for vendor selection The Ohio State University, 1991.*

Infotivity.com Web Pages Infotivity, 2001, Retrieved from Archive.org Oct. 13, 2008.*

PeopleSoft Delivers Strategic Sourcing to the Public Sector Business Wire, Jul. 22, 2002.*

Smith, Tom, PeopleSofts new SCM apps Asia Computer Weekly, May 13, 2002.*

Thompson, Kenneth, Scaling Evaluative Criteria and Supplier Performance Estimates in Weighted Point Repurchase Decision Models, International Journal of Purchasing and Materials Management, vol. 27, No. 1, Winter 1991.*

Eckerson, Wayne, Software Aids in Drafting RFPs, Evaluating Responses NetworkWorld, vol. 8, No. 46, Nov. 18, 1991.*

Thompson, Kenneth, Vendor Profile Analysis Journal of Purchasing and Materials Management, vol. 26, No. 1, Winter 1990.*

Berens, John S., A Decision Matrix Approach to Supplier Selection Journal of Retailing, vol. 47, No. 4, Winter 1971-1972.*

Infotivity Web Pages Infotivity Technologies, Inc., 2000 Retrieved from Archive.org Oct. 13, 2008.*

Klotz, Uwe et al., A new Vendor Evaluation Product for SAP R/3 Systems ESIT 2000, Sep. 2000.*

Grimmer, Udo, The Vendor Evaluation Product at DaimlerChrysler ESIT 2000, Sep. 2000.*

MM Vendor Evaluation Release 4.6c SAP, 2000.*

A lineup of suites: PeopleSoft MSI, vol. 20, No. 7, Jul. 2002.*

Banfield, Emiko, Harnessing Value in the Supply Chain—Strategic Sourcing in Action Wiley & Sons Inc. 1999, ISBN 0-471-34975-5.*

Nelson, Harry, How to Evaluate Propsals for Computer Systems Canadian Datasystems, vol. 13 No. 12, Dec. 1981.*

Infotivity Web Pages Infotivity Technologies, Inc., 2000, Retreived from Archive.org Oct. 13, 2008.*

* cited by examiner

Analyze Events

Analyze Total  Analyze Line  Award Summary  Award Details

Business Unit: US001  Event ID: 0000000009  Name: Laptop Purchase  Currency: USD
Event Format: Buy  Event Type: Blind Bid  Finish: 08/19/02 8:45PM PDT  Status: Pend Award

Line Information

Line Number: 1  Event Quantity: 200.0000  UOM: EA  Start Price: 7000.000000
Item ID: AP-002  Item Description: Laptop CPU 450Mhz, 64Mb RAM, CD-Rom  Weighting: 1.00000

Sort Bids

Sort Bids By: Line Score  Sort Order: Descending  [Sort]  — 602

Analysis

|  | Company A | Company B | Company C |
|---|---|---|---|
| Bidder Name: |  |  |  |
| Bid Number: | 1 | 1 | 1 |
| Bid Quantity: | 200 | 200 | 200 |
| Total Bid Amount: | 114000.00 | 112000.00 | 124000.00 |
| Total Line Score: | 0.721 | 0.647 | 0.576 |

— 604

| Award Event: |  |  |  |
|---|---|---|---|
| Award by Percent: |  |  |  |
| Award Quantity: |  |  |  |

— 606

▼ Factors

Add/Edit Bid Factors

| | Weighting | UOM | Ideal | Company A | Company B | Company C |
|---|---|---|---|---|---|---|
| What is your bid price for this item? | 0.60000 |  | 0 | 5700 | 5600 | 6200 |
| What is the length of the product warranty offered on this product? | 0.20000 | EA | 10 | 5 | 2 |  |
| Who manufactures this item? | 0.10000 |  | DELL | SONY | GATEWAY | DELL |
| Have we done business with this bidder before? | 0.10000 ← 612 |  | Y ← 610 | N | N | N |

[Recalculate]

— 608

[Save] [Return to Search] [Next in List] [Previous in List] [Notify] [Refresh]

Analyze Total | Analyze Line | Award Summary | Award Details

SYSTEM AND METHOD FOR IDENTIFYING SOURCING EVENT METRICS FOR ANALYZING A SUPPLIER

CROSS-REFERENCES TO RELATED APPLICATIONS

Not applicable.

BACKGROUND OF THE INVENTION

1. Field of the Invention

The present invention relates generally to the field of e-commerce, and more particularly to a system and method for identifying sourcing event metrics for analyzing a supplier.

2. Background of the Invention

Requests for quotes and auction-type events are increasingly becoming a popular manner by which to solicit bids from multiple suppliers. These requests seek to select the "best" or most appropriate bids from a pool of bidders or suppliers. In other words, multiple suppliers or bidding entities are invited to place bids related to providing an item or service. Frequently, a supplier is chosen merely based on the price offered to complete a project, provide a service, provide a product, and so on. Disadvantageously, this bidding process fails to factor in other variables that may be significant in selecting the most appropriate supplier.

Due to this disadvantage, strategic sourcing processes often take into account a variety of additional factors associated with a particular supplier. In other words, price may be only one of many factors considered when selecting a supplier. For instance, a time for delivery of a particular product may be a factor taken into consideration. Typically, these additional factors may prove to be as important as price to a consumer selecting a supplier. For example, a consumer may be willing to pay a higher price for faster delivery of a product.

In order to allow for consideration of various factors in the bidding process, in addition to the price factor, some consumers have adopted the use of metrics. Metrics set forth a variety of variables that may be contemplated when choosing a supplier, including, but not limited to, price. Typically, the use of metrics is a manual process. Accordingly, creating metrics and generating usable data from the metrics is a laborious process. Often, complex spreadsheets need to be developed by a consumer in order for metrics data to be evaluated. Thus, a great deal of time and effort is expended to produce a document that is utilized for a single project. Furthermore, the spreadsheets are frequently tailored to a specific set of suppliers and accordingly are not usable in evaluating other sets of suppliers. Thus, utilizing metrics is frequently too cumbersome to merit employing a metrics identification and analysis process.

Therefore, it can be appreciated that there exists a need for a system and method for identifying sourcing event metrics for analyzing a supplier. There exists a further need for a process for efficiently querying suppliers in relation to these metrics.

SUMMARY OF THE INVENTION

The present invention provides in various embodiments a system and method for identifying sourcing event metrics for analyzing a supplier.

In a system according to one embodiment of the present invention, the system facilitates identification of sourcing event metrics for analyzing a supplier. A consumer computing device is utilized to identify a sourcing event and to query a supplier. A database stores one or more predefined metrics associated with the sourcing event. A metric identification engine is utilized to populate the sourcing event with the one or more predefined metrics, to establish a weight associated with the one or more predefined metrics, and to establish a points value associated with the one or more predefined metrics. A metric evaluation engine receives response data to a query associated with the one or more predefined metrics and rates the supplier based on the response data received according to the weight and points value.

In a method according to another embodiment of the present invention, the method facilitates identification of sourcing event metrics for analyzing a supplier. A sourcing event is identified and populated with one or more associated predefined metrics. A weight associated with the one or more predefined metrics is established and a points value associated with the one or more predefined metrics is established. A supplier is queried for response data related to the one or more predefined metrics. The response data is received from the supplier and the supplier is rated based on the response data received according to the weight and points value.

A further understanding of the nature and advantages of the inventions herein may be realized by reference to the remaining portions of the specification and the attached drawings.

BRIEF DESCRIPTION OF THE DRAWINGS

FIG. 6 is a screen shot showing an exemplary analysis page in accordance with an embodiment of the invention.

DESCRIPTION OF THE SPECIFIC EMBODIMENTS

Figure 1:
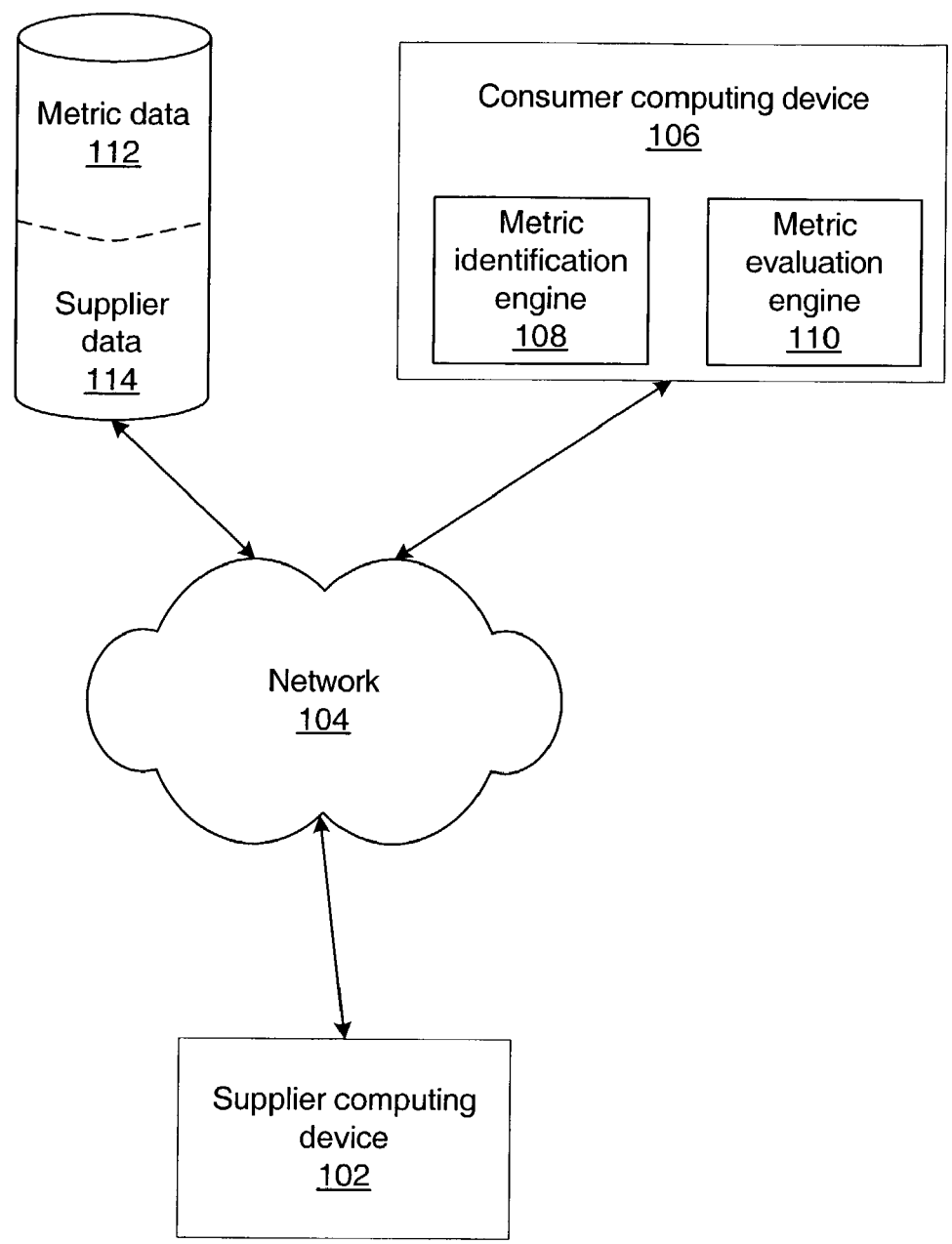
FIG. 1 a schematic diagram of an exemplary architecture for identifying sourcing event metrics for analyzing a supplier.

As shown in the exemplary drawings wherein like reference numerals indicate like or corresponding elements among the figures, embodiments of a system and method according to the present invention will now be described in detail. The following description sets forth an example of a system and method for identifying sourcing event metrics for analyzing a supplier.

The present invention allows a user desiring to obtain goods, services, etc., namely a consumer, to solicit bids from a user desiring to provide those goods, services, etc., namely a supplier. The consumer may create an event, referred to herein as a sourcing event, designed to solicit bids from the supplier by posing various queries and identifying criteria by which to measure responses to the queries utilizing the processes set forth by the present invention.

The consumer can generate the criteria themselves and identify parameters associated with the criteria by utilizing previously created events and the criteria and parameters associated with those events. The consumer can also create an original event utilizing individual predefined queries and criteria and parameters associated with those queries, which can be saved for future use by the consumer or other consumers. Utilizing the supplier's response to the queries presented via the event and the criteria and parameters utilized to measure the responses to the queries, the consumer can rate or otherwise analyze the supplier. Ideally, the rating of the supplier(s) enables the consumer to select the most appropriate supplier (s) to provide the goods, services, etc.

Referring now to FIG. 1, a schematic diagram of an exemplary architecture for identifying sourcing event metrics for analyzing a supplier is shown. Supplier computing device 102 is coupled to consumer computing device 106 via network 104. Supplier computing device 102 may be any type of computing device suitable for use with the present invention, such as a computer, a personal digital assistant (PDA), a wireless device, and so on. Further, network 104 may include any type of network suitable for use with the present invention, such as a wide area network (WAN), like the Internet, a local area network (LAN), a wireless network, etc.

Consumer computing device 106 includes metric identification engine 108 and metric evaluation engine 110 in one embodiment of the invention. Consumer computing device 106 may be any type of computing device suitable for use with the present invention, such as a computer, a PDA, a wireless device, etc.

Metric identification engine 108 identifies metrics for evaluating a supplier. For instance, a user may create original, or otherwise new, metrics utilizing metric identification engine 108, locate previously created metrics utilizing metric identification engine 108, etc. Metric evaluation engine 110 evaluates the supplier utilizing the metrics identified via metric identification engine 108. For example, metric evaluation engine 110 may include instructions for rating a supplier according to metrics identified by the consumer, or a user generally. Exemplary processes performed by metric identification engine 108 and metric evaluation engine 110 are further discussed herein.

Metric data 112 and supplier data 114 represent data storage. As shown in FIG. 1, metric data 112 and supplier data 114 are accessible by consumer computing device 106 via network 104. However, metric data 112 and supplier data 114 may be directly coupled to consumer computing device 106 in one embodiment. Metric data 112 and supplier data 114 may be stored in a single database or separate databases. Any type of data storage suitable for use with the present invention may be employed for storing metric data 112 and supplier data 114.

As discussed herein, the consumer represents a user soliciting bids associated with a product, service, etc. The supplier represents a user submitting information related to the bid associated with the particular product, service, etc. Generally, the supplier submits bid related data to the consumer in the context of a sourcing event. A sourcing event includes any event that represents the product, service, etc. that the consumer desires to evaluate. The sourcing event is created in order to represent the metrics the consumer may utilize to "measure" the supplier. These "measurements" may be utilized to help the consumer reach a decision as to which supplier(s) the consumer will choose to provide the particular products, service, etc.

A supplier may be invited by the consumer to "bid" on one or more sourcing events. For instance, the supplier may be invited to bid on an office furniture sourcing event and a computer hardware sourcing event. The "bid" provided by the supplier can represent a wide range of data input by the supplier, the data analyzed utilizing the metrics discussed herein. For example, the supplier's bid may include data related to price, warranty, service contract terms, etc.

Figure 2:
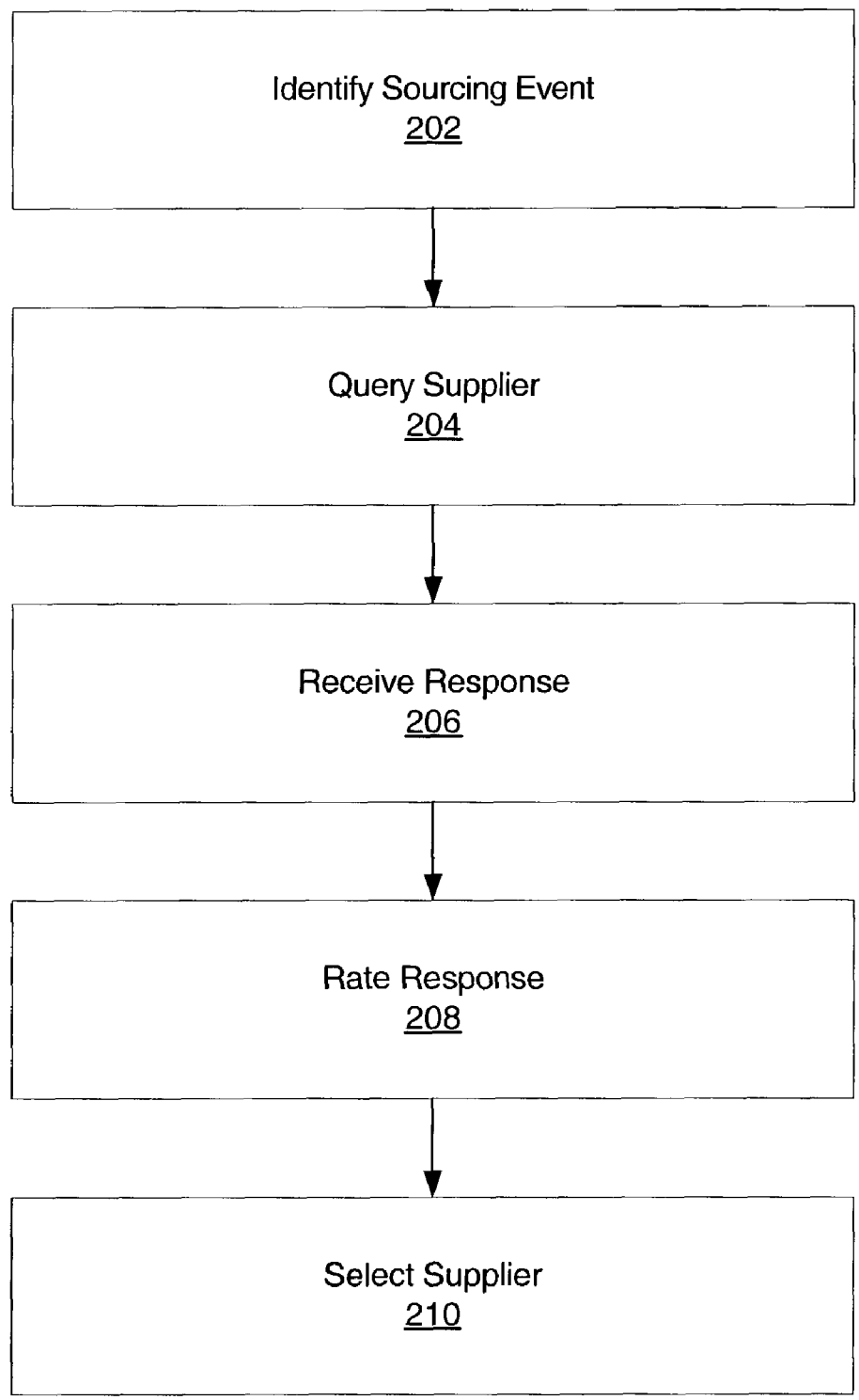
FIG. 2 is a flowchart illustrating a process for selecting a supplier in accordance with an embodiment of the invention.

Referring now to FIG. 2, a flowchart illustrating a process for selecting a supplier in accordance with an embodiment of the present invention is shown. In step 202, a sourcing event is identified. Identifying the sourcing event may include creating the sourcing event or selecting an existing sourcing event.

In order to create a new sourcing event, the consumer creates queries and response fields. The consumer can establish a points value for potential responses to the queries created. Points values may be represented by any value, such as numbers, a range of numbers, a percentage, etc. Furthermore, the consumer can establish a weight to the queries created, the weight representative of the importance of the particular query relative to other queries created by the consumer within the same sourcing event.

An existing sourcing event includes a predefined set of queries. Weights may be associated with the queries and/or points may be associated with potential responses to the queries. These queries and associated weights and points are referred to as metrics, due to their function of "measuring" the supplier's bid according to data entered by the supplier.

An existing sourcing event may include one or more predefined metrics. Generally, this means that a predefined query, a predefined weight, and/or a predefined points value is associated with the sourcing event. Predefined queries may be in raw form. For instance, an existing sourcing event for a car may include a warranty metric, a color metric, an interior fabric metric, etc. Each metric is essentially a raw query, since it clearly can be utilized to solicit information even without a more specific query. In other words, the title of the metric hints at the information being sought. However, generally a more specific query is formulated by the consumer in order to avoid varying interpretations of the broader query by the supplier.

Thus, an existing sourcing event generally has some form of query associated with the sourcing event. However, weights and/or points values may or may not have been saved as part of the sourcing event. Accordingly, if a consumer identifies an existing sourcing event, the consumer may add weights and/or points to the metrics depending upon whether or not weights and/or points were originally established in relation to the particular metric queries and saved as part of the sourcing event in association with the particular metric queries. If weights and/or points were saved in relation to the particular queries, the consumer may modify the weights and/or points, as well as any formulated queries, as discussed herein.

The consumer can select the existing sourcing event and either utilize the existing metrics, add to the existing metrics, and/or change the existing metrics. In other words, the consumer can create an original or new sourcing event, modify an existing sourcing event, or utilize an existing sourcing event in its present condition.

As discussed herein, in order to create a new or original sourcing event, the consumer can create one or more queries. The consumer can establish a specific point value to potential responses to the queries, as well as a weight of the queries in relation to other queries. Various queries may be included as part of the sourcing event. Each query is typically designed to solicit information that will assist the consumer in selecting one or more suppliers to supply the product, service, etc.

The points assigned to potential responses to the queries may depend upon the potential responses themselves. For instance, if the potential responses are yes or no, the points are likely zero points or a specified point value, depending on whether an affirmative or negative response is desired. If one response is simply more preferable than the other, specific points, rather than points versus no points, may be established. If the potential responses include numerous responses, some responses more desirable than others, points are likely established based on a points value range, with the highest point value representing the most desirable response, the lowest point value representing the least valuable response, and the points in the middle of the range representing answers ranked according to most versus least desirable response.

In order to utilize an existing sourcing event or to create a sourcing event from an existing sourcing event, the consumer can search a database that includes the sourcing events previously created. One way of searching for previously created sourcing event includes a name search. The title of the sourcing event may accurately represent the subject matter of the sourcing event. For instance, previously created sourcing events for obtaining t-shirts for a rock concert may be entitled "rock concert t-shirts." The creator of the sourcing event, however, may assign any title to the sourcing event.

The consumer may also search for previously created sourcing events by a keyword search, by searching within electronic file directory folders, etc. The consumer can input any search preferences for locating sourcing events in accordance with the invention. Once the consumer has identified the sourcing event the consumer wishes to utilize, the consumer can utilize the sourcing event as is, or modify the sourcing event to fit the consumer's needs. As discussed herein, an existing sourcing event includes some form of a query, but does not necessarily include a weight and/or points value associated with the query, depending upon how the sourcing event was saved by a previous user. Modifications to the existing sourcing events are preferably incorporated utilizing a "save as" function, so as to protect the existing sourcing event from changes. Modifications may include, for example, addition of metrics and/or deletion of metrics.

The consumer can save the sourcing event so that future users can select the event having the queries predefined for the user. The points and/or weights can also be saved in association with the queries so that future users can select the event having the queries as well as the weights and/or the points predefined for the user. Furthermore, the consumer can save the queries, the weight of the queries, and the points established for potential responses to the queries as a single metric for future use. For example, the consumer may create a metric named "desk" and assign the query "what material is the desk?" and/or "what is the size of the desk," etc. The user may establish the weight as 30%, and the point value as 10 points for solid wood, 9 points for metal, 8 points for wood finish, and so on. "Desk" may represent a sourcing event in itself or it may be part of another sourcing event called "office furniture." Thus, the user creating the "office furniture" sourcing event may choose the desk metric as one predefined metric and create a "desk chair" metric, a "desk lamp" metric, etc. Thus, the consumer can save metrics the consumer creates as a named sourcing event, which may later be utilized as a sourcing event, or as part of another sourcing event.

In step 204, a supplier is queried utilizing the metrics discussed herein. One or more queries may be presented to the supplier via the sourcing event. As discussed herein, one or more queries are associated with a created sourcing event. Accordingly, if the consumer chooses a previously created sourcing event, the queries associated with the sourcing event will automatically populate a query page. Furthermore, points values related to potential responses to the queries and/or a weight of the query in relation to other metrics within the sourcing event may be automatically established.

In step 206, a response to the one or more queries is received. As discussed herein, the one or more queries include a response field to allow the supplier to respond to the query. The supplier may enter the response or select from a list of potential responses. For example, in response to a query inquiring as to the length (e.g., in days, years, etc.) of warranty offered by the supplier, the supplier may choose from a pull-down menu including the numbers 1, 5, 10 and so on, or the supplier may enter the response of 7. The consumer may choose to allow the supplier to enter the response, to choose from the pull-down menu, or both.

Each metric includes a points value that measures a particular response to the query. The points value determines how much credit the supplier will receive for the particular response. For instance, in the warranty example above, the supplier may receive 100% of the points available for a 10 year warranty response, 75% of the available points for a 5 year warranty response, etc.

Each metric also measures the weight of the particular query response in relation to other metrics. For instance, in the warranty example discussed herein, the warranty metric may be worth 20% of the total sourcing event, in relation to other metrics. Thus, in the warranty example, the supplier that answers 5 in response to the number of years covered by the warranty, receives 75% of the 20% available for that particular metric. A variety of metrics may factor into the overall sourcing event. For instance, the consumer may consider the metrics that require consumer input, the metrics that require supplier input, the consumer may create metrics to measure the supplier based on outside input, such as a rating by a business organization, etc.

In step 208, the response is rated. In order to rate the response, the sourcing event metrics are analyzed. As discussed herein, the metrics may be identified by metric identification engine 108 and analyzed by metric analysis engine 110 on consumer computing device 106 (FIG. 1). In step 210, the supplier is selected. The supplier may be selected according to the rating assigned to the supplier based on the metrics, as discussed herein.

The rating may be represented by a score, by a percentage of ideal responses, by a summary of the advantages and disadvantages of utilizing the particular supplier, etc. The rating depends upon the input requested by the consumer. For instance, if the consumer requested text entries by suppliers, the rating may provide feedback in the form of a percentage based on the number of keywords matching an ideal answer key. However, if the consumer requested entries based on a pull down menu, yes/no, etc., the rating may provide feedback in the form of a numerical score. The numerical score can be translated utilizing a key associated with the particular sourcing event or the consumer can create a key. For example, the supplier may be assigned a numerical score of 90 on a scale of 1 to 100, with 100 being the best possible score.

In order to analyze the supplier and provide a supplier score with respect to the particular sourcing event, an algorithm may be employed that multiplies points values for each metric by the weighting for the particular metric. The points value for each metric may then be summed and presented to the consumer along with a points range that allows the consumer to identify the "best" supplier based on the total points value. However, any manner of calculating the score and analyzing the supplier is within the scope of the invention.

In one embodiment of the invention, the response may be analyzed but not rated. For example, an analysis may include advantages and disadvantages of utilizing a particular supplier or set of suppliers without an accompanying rating. The advantages and disadvantages can be based upon a key of responses and the benefits and detriments of the responses or a subjective analysis can be performed and output in summary format. Alternatively, the response may be analyzed and output in summary format with a rating included for reference.

Figure 3:
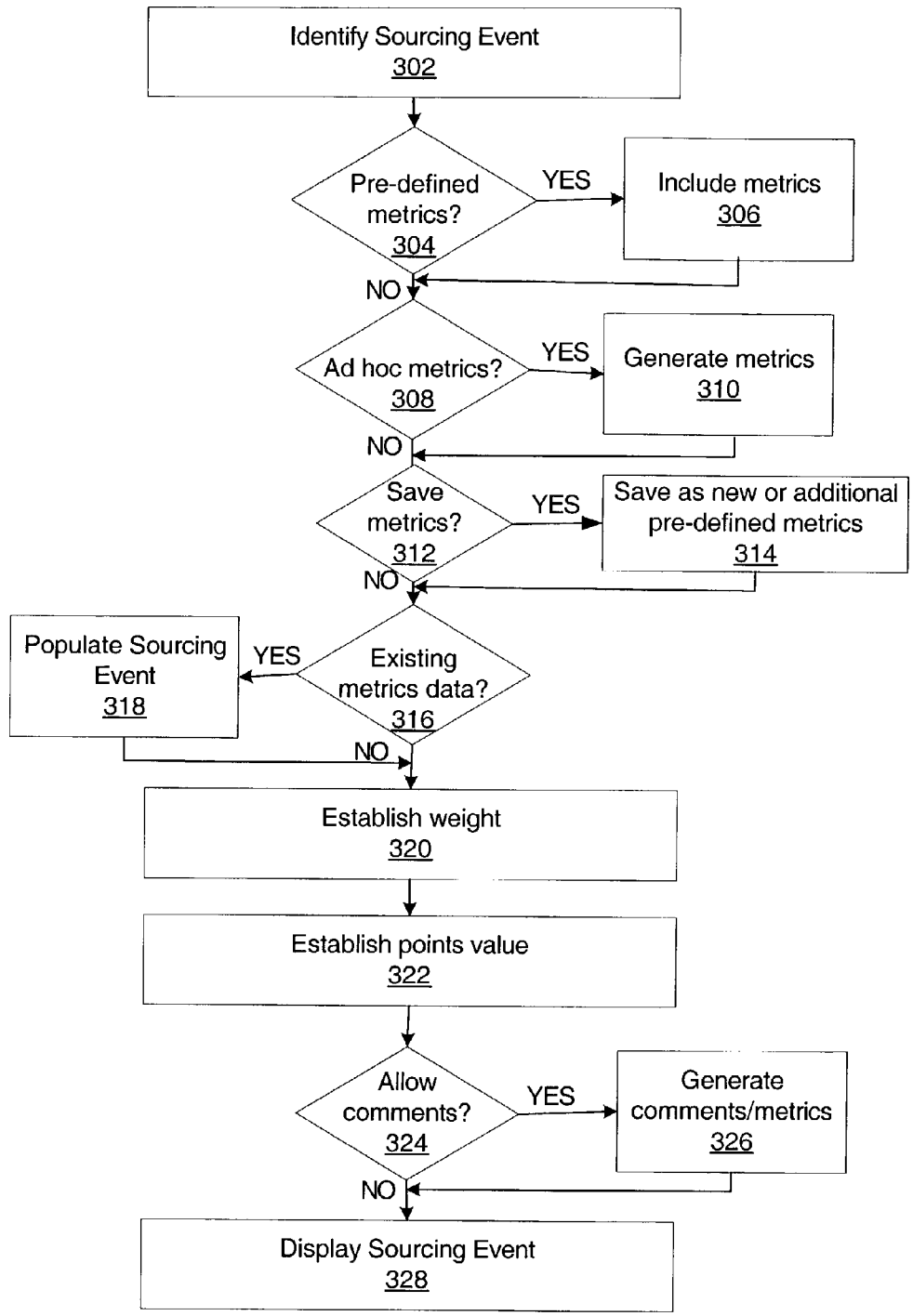
FIG. 3 is a flowchart illustrating a process for generating a sourcing event in accordance with an embodiment of the invention.

Referring now to FIG. 3, a flowchart illustrating a process for generating a sourcing event in accordance with an embodiment of the invention is shown. At step 302, the sourcing event is identified. As discussed herein, identifying the sourcing event includes selecting a previously created sourcing event or beginning the process of creating an original sourcing event. An existing sourcing event has associated with it a predefined set of metrics. For instance, predefined queries, weights, and/or points values may be associated with the particular sourcing event. The consumer may modify the metrics to better represent the consumer's goals with respect to the sourcing event and/or utilize the one or more predefined metrics provided.

At step 304, consumer computing device 106 determines whether a predefined metrics set will be utilized for the sourcing event identified. As discussed herein, the predefined metrics set is a grouping of metrics that are associated with the particular sourcing event identified. The grouping may consist of one or more queries, which may also include weights and/or points values associated with the queries. If weights and/or points values have not been predefined in relation to the queries and the sourcing event, the consumer can establish weights and/or points values for the queries by creating weights and/or points values. As discussed herein, if the weights and/or points have been predefined in relation to the queries and the sourcing event, the consumer can modify the weights and/or points or the consumer can accept the predefined weights and/or points values. In other words, the user can choose to incorporate weights and/or points that have previously been assigned to the sourcing event in relation to the predefined queries and/or the consumer can choose to redefine the weights and/or points previously assigned.

An example of an existing sourcing event having associated with it one or more predefined metrics that include a query, a weight, and a points value is a "T-shirt" sourcing event. When the consumer selects the existing sourcing event "T-shirts," queries for size and color may automatically populate the particular sourcing event. These metrics may be represented in query format, such as "in what colors is the T-shirt available?" Metrics for size and color may also be predefined, such as metrics that default, or otherwise are automatically associated with the predefined sourcing event, to color weighted at 40% and size weighted at 60%. Furthermore, metrics associated with points related to potential responses may be predefined. For example, metrics may default to 100% of the points if the supplier provides blue t-shirts, 75% of the points if the supplier provides red t-shirts, and so on. Thus, the supplier who provides red t-shirts, but not blue, receives 75% of the points available. The points available account for 40% of the overall event.

At step 306, the predefined metrics are included in the sourcing event. The consumer may choose to include all of the metrics associated with the sourcing event or only a portion of the predefined metrics for the particular sourcing event. Further, the consumer may choose to include the predefined metrics, but change the parameters associated with the metrics. For instance, the consumer may choose to include the "t-shirt" metric, but may change the format of the query to suit the consumer. In one embodiment, the query may be displayed in one or more alternative languages according to a language selected by the supplier. The consumer may also choose to change the points value and/or the weighting of the predefined metrics, for instance, as discussed herein.

At step 308, the consumer decides whether or not to add ad hoc metrics to the sourcing event. Ad hoc metrics includes any metrics created by the consumer or selected by the consumer from a list of metrics. Although ad hoc metrics may be predefined as part of a list or another sourcing event, ad hoc metrics have not previously been identified as part of the particular sourcing event the consumer has identified. Accordingly, the consumer can add these metrics to the sourcing event identified.

If ad hoc metrics are being added, these metrics are generated in step 310. Generating the metrics includes creating queries, creating points values for potential responses to the queries, and creating a weight for the metric in relation to other metrics associated with the sourcing event. As discussed herein, the ad hoc metrics may also be generated by selecting the metric(s) from a predefined list of individual metrics that are not currently associated with the sourcing event the consumer identified. The predefined list of individual metrics typically includes a title, category, etc. for the individual metric to identify the metric topic. As with other predefined metrics, a query is generally associated with the individual predefined metric, whereas a predefined points value and/or a weight may be associated with the individual metric depending upon how it was saved by a previous user.

At step 312, the consumer decides whether or not to save the metrics. If the consumer decides to save the metrics, the metrics are saved at step 314. The consumer may save newly created metrics to a list so that future consumer's can select the metrics from an individual pre-existing metrics list, as discussed herein. Further, the consumer may save the metrics in association with the sourcing event. If the consumer saves the metrics as new or additional predefined metrics associated with the sourcing event, the predefined metrics will populate a sourcing event page when future consumers select the particular sourcing event. Accordingly, the consumer may assign a name or other identifying feature, such as a number, etc., to the event for purposes of locating the particular event in the future. Thus, the consumer and/or other consumers may utilize the stored sourcing event to avoid the task of newly creating sourcing events in the future by utilizing the stored sourcing event as is or modifying the sourcing event, as discussed herein.

At step 316, consumer computing device 106 determines whether there is existing metrics data for a particular supplier. Existing metrics data is data stored for a particular supplier that can be utilized to populate the response fields of the sourcing event. Populating response fields with existing data related to the particular supplier can help to create consistency in responses and can create efficiency by avoiding repetitious responses from the supplier. The supplier can be queried as to whether the pre-populated response data is still accurate and given the opportunity to modify the pre-populated response data.

Existing metrics data for a particular supplier may be generated based on previous business conducted with the particular supplier. Accordingly, information obtained from the supplier on previous occasions is stored and accessible for future use.

In order to access the sourcing event and enter information related thereto, the supplier may be directed to a registration page. Existing metrics data for the particular supplier may also be obtained from data entered by the particular supplier during this registration process for the sourcing event. For example, during the registration process for the sourcing event, the supplier may be asked to enter whether the supplier is a minority or woman-owned business (MBWB). Government agencies often consider such information when analyzing bid related data. The response entered to this question during registration can be utilized to pre-populate the response field for a similar or related query included as part of the sourcing event itself. If existing metrics data is accessible, the metric identification engine 108 populates the sourcing event with the existing metrics data in step 318.

At step 320, a weight related to the one or more metrics included in and/or generated for the particular sourcing event is established. As discussed herein, establishing the weight may include accepting the predefined weight associated with a particular metric, modifying the predefined weight, or creating a new weight. The weight is a percentage a particular metric represents with respect to relative importance in calculating a score or rating for the supplier. For example, returning to the "t-shirt" sourcing event example, color may be assigned a weighting of 40%, meaning that the color metric for the sourcing event is worth 40% of the total rating.

Generally, the weight established is relative to other metrics included in the sourcing event. For instance, if the color metric is weighted at 40%, the remaining metrics, or metric, cannot be weighted at more than 60% in total. As discussed herein, the weight established in relation to the particular metric generally represents the importance of that particular factor to the consumer in relation to the overall sourcing event and the other factors being considered as part of the sourcing event.

At step 322, a points value is established in relation to the one or more metrics associated with the particular sourcing event. As discussed herein, establishing the points value includes accepting a predefined points value associated with a particular metric, modifying the predefined points value, or creating a new points value. The points value represents the grade for the particular metric according to the response. For instance, if the supplier offers blue t-shirts, the supplier may receive the highest grade for the color metric, while the supplier offering only red and white t-shirts may only receive a modest grade for the color metric. The consumer may determine points values based on a scale with numbers representing the best and the worst answers. The scale may include any range in accordance with the present invention. For instance, every answer may receive the same number of points, the range may include 100 possible points variations, the range may simply include two possible points values, etc.

Generally, the consumer establishes a similar points value range for each metric in the overall sourcing event. A similar points value range may ensure that the weight assigned to the particular metrics will not be skewed by varying points value ranges. For example, if t-shirt color is weighted 50% and blue is worth 10 points on a scale of 1 to 10, but with respect to size, being weighted 50%, XXL is worth 80 points on a scale of 1 to 100, the points value range may override the weight assigned to the metrics. In other words, size will potentially generate the higher points value and effectively carry more weight than color, despite the establishment of equal weights for the metrics. Accordingly, similar points value ranges are typically established in order to provide the intended analysis and rating of the supplier. However, the consumer may establish any points value ranges in accordance with the invention, including, but not limited to, varying points value ranges for different metrics within the same sourcing event.

Due to the potential skewing of results caused by utilizing varying points value ranges, the consumer may modify the established points value when identifying a sourcing event. The established points value ranges may be different within the same sourcing event due to the points value ranges generated by the previous consumer. In addition, the points value ranges may vary due to modifications to the sourcing event by the current consumer, such as by adding metrics to the sourcing event.

In step 324, the consumer determines whether comments are allowed. The consumer may provide a field associated with the one or more metrics that allows the supplier to enter comments related to a particular metric, the supplier's response associated with the metric, etc. If the consumer decides to allow comments, a comment area and/or metric are generated in step 326.

If the consumer considers the comments by the supplier subjectively, a comment field is generated. Typically, the consumer reviews the comments and considers the comments when selecting a particular supplier. However, in one embodiment, if the consumer chooses to consider the comments objectively, a metric is generated for the comments, in addition to displaying the comment field, so that the comments can be taken into account during the analysis phase. For example, the consumer may simply assign a points value and weight to the comment after reviewing the comment in order to allow the comment to be considered in the overall rating for the particular supplier. The consumer may assign the points value to the comment based on key words, etc. If the comment is not factored into the analysis as a metric, the consumer simply subjectively considers the comments along with the analysis based on the other metrics associated with the sourcing event.

Optionally, in step 328, the sourcing event may be displayed. A list of sourcing events may be displayed to the supplier. The supplier can provide information related to a particular sourcing event by clicking on one of the sourcing events in the list. Alternatively, a link to the particular sourcing event may be communicated to the supplier, such as via email, telephone, mail, etc., for allowing the supplier to access the particular sourcing event. In one embodiment, the supplier can complete a sourcing event form received via mail, PDF file, etc. The supplier can then mail, fax, call-in, etc. the form to the consumer. As discussed herein, the supplier may complete a registration process associated with the sourcing event when the supplier accesses the sourcing event. Where the supplier completes a sourcing event form, as discussed herein, a registration form may also be completed by the supplier.

Once the supplier selects the particular sourcing event, the supplier can enter information related to the sourcing event. The supplier may be queried for name, location, etc. These queries are generally part of the registration process for the sourcing event and are not typically measured by the metrics discussed herein. The supplier, however, is also queried for bid related data, which does correspond to metrics, such as a query as to pricing, a points value for the particular pricing information provided, and a weight related to the pricing metric, and so on, as discussed herein.

Figure 4:
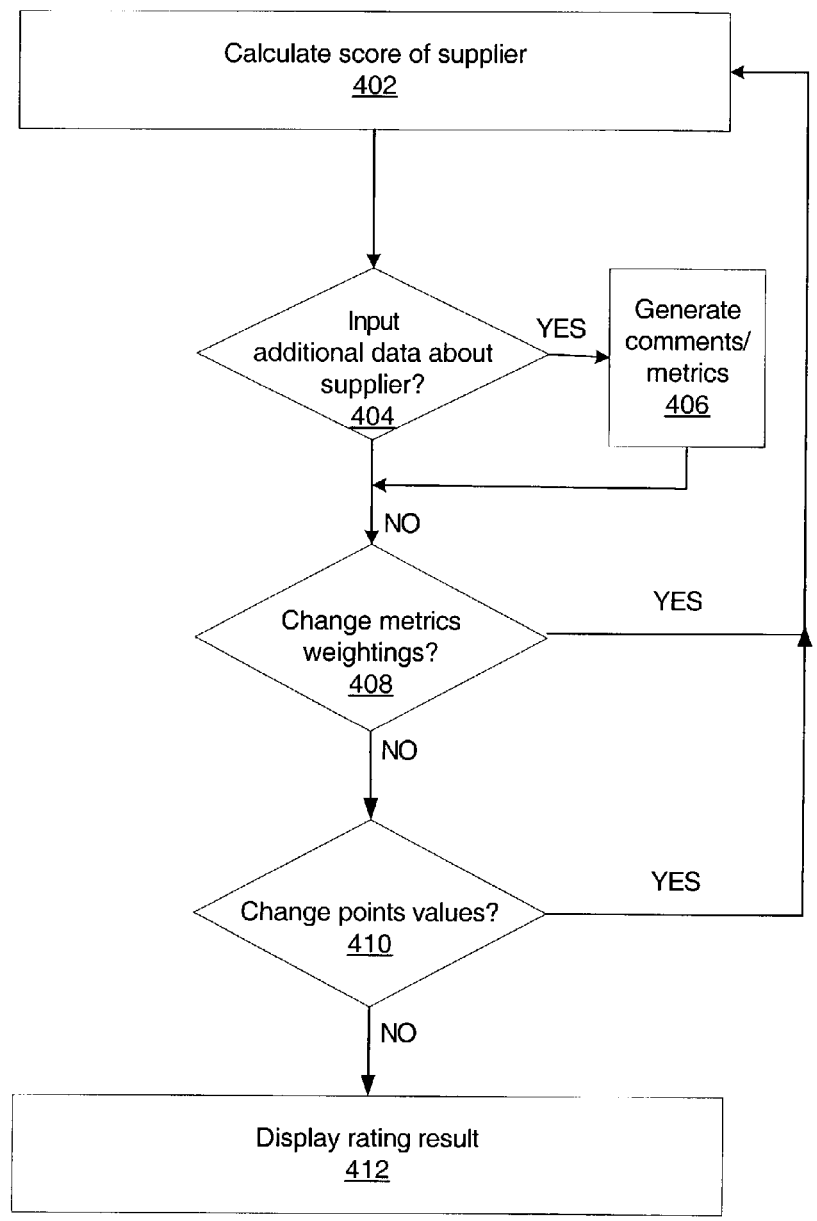
FIG. 4 is a flowchart illustrating a process for analyzing a supplier in accordance with an embodiment of the invention.

Referring now to FIG. 4, a flowchart illustrating a process for analyzing a supplier in accordance with an embodiment of the invention is shown. At step 402, metric evaluation engine 110 calculates a score for the supplier. In other words, the response of the supplier is rated. The score is calculated according to supplier input, and possibly consumer input. As discussed herein, the score may be calculated utilizing an algorithm that multiplies metric points values by metric weights and sums the resulting figure with figures related to other metrics within the same sourcing event. However, any type of analysis is within the scope of the invention, including, but not limited to, other types of algorithms for calculating "a score."

For example, a warranty metric may include a query "what is the length of the warranty?," as well as a points value ranging from 0 to 10, and a weighting of 20%. If the supplier responds to the query noting that the length of the warranty the supplier provides is one year, the supplier may receive 5 of the 10 points allowed for the warranty metric. The 5 points the supplier receives for the particular response to the query comprises 20% of the total score or rating for the supplier. The points values associated with the other metrics that are part of the sourcing event are calculated to reveal a total score or rating for the particular supplier. For instance, product price may be weighted at 60% and product color may be weighted at 20%. As discussed herein, a points value range for product price and product color may also be established as the range from 0 to 10, but varying points value ranges for metrics associated with the same sourcing event are within the scope of the invention. The rating for each supplier participating in the particular sourcing event will typically vary according to the varying information input by each supplier. However, similar scores for each supplier are also foreseeable.

At step 404, the consumer may input additional data about the supplier. If the consumer chooses to input additional data about the supplier, comments/metrics are generated at step 406. The consumer may simply choose to create an area in which the supplier can enter comments related to a specific metric and/or the sourcing event as a whole. In one embodiment, the consumer can view comments associated with the particular metric by moving the consumer's mouse over an icon located near the response field.

In another embodiment, the comment area is hidden from the supplier and/or accessible only by the consumer. The consumer may choose to input comments with respect to a supplier demonstration attended by the consumer, for example. Similarly, the consumer may choose to create a metric for the demonstration to allow for consideration of the demonstration with respect to the calculated score for the particular supplier, as discussed herein. For instance, the consumer may simply enter a points value for the demonstration based on the consumer's opinion as to the value of the demonstration. The consumer may also enter a weight associated with the demonstration metric. Accordingly, the demonstration can be considered in calculating a score for a particular supplier.

At optional step 408, the consumer may change the weight associated with the particular metric. If the consumer changes the weight, the score of the supplier is calculated again at step 402. The consumer may choose to change the weight of a metric for any number of reasons. For example, the weight of the metric may be changed due to a new accounting quarter, a policy report, additional information realized, mere choice of the consumer, etc. The metrics may be modified and the score of the supplier recalculated as many times as the consumer chooses to make modifications.

At optional step 410, the consumer may change the points value range and/or points value assigned to a response. Accordingly, the calculated score for the supplier will also change. For instance, the consumer may decide to change the top of the points range based on an unexpected response from a particular supplier that necessitates a wider points range. The points values may be changed for any reason according to the invention. Once the points values and/or points value range has been modified, the score of the suppliers can be recalculated.

Weights associated with particular metrics may also be changed for any reason according to the invention. For instance, the consumer may realize that a delivery date is more important than a warranty, due to the Christmas season. Accordingly, the consumer may adjust the weights and recalculate the overall rating following the modification.

The rating result is then displayed at step 412. The rating result allows the consumer to evaluate the scores of the supplier(s) and select the supplier according to the score, or any other criteria. As discussed herein, the rating may be displayed as a number, a percentage of responses matching "ideal" responses, and so on.

Figure 5:
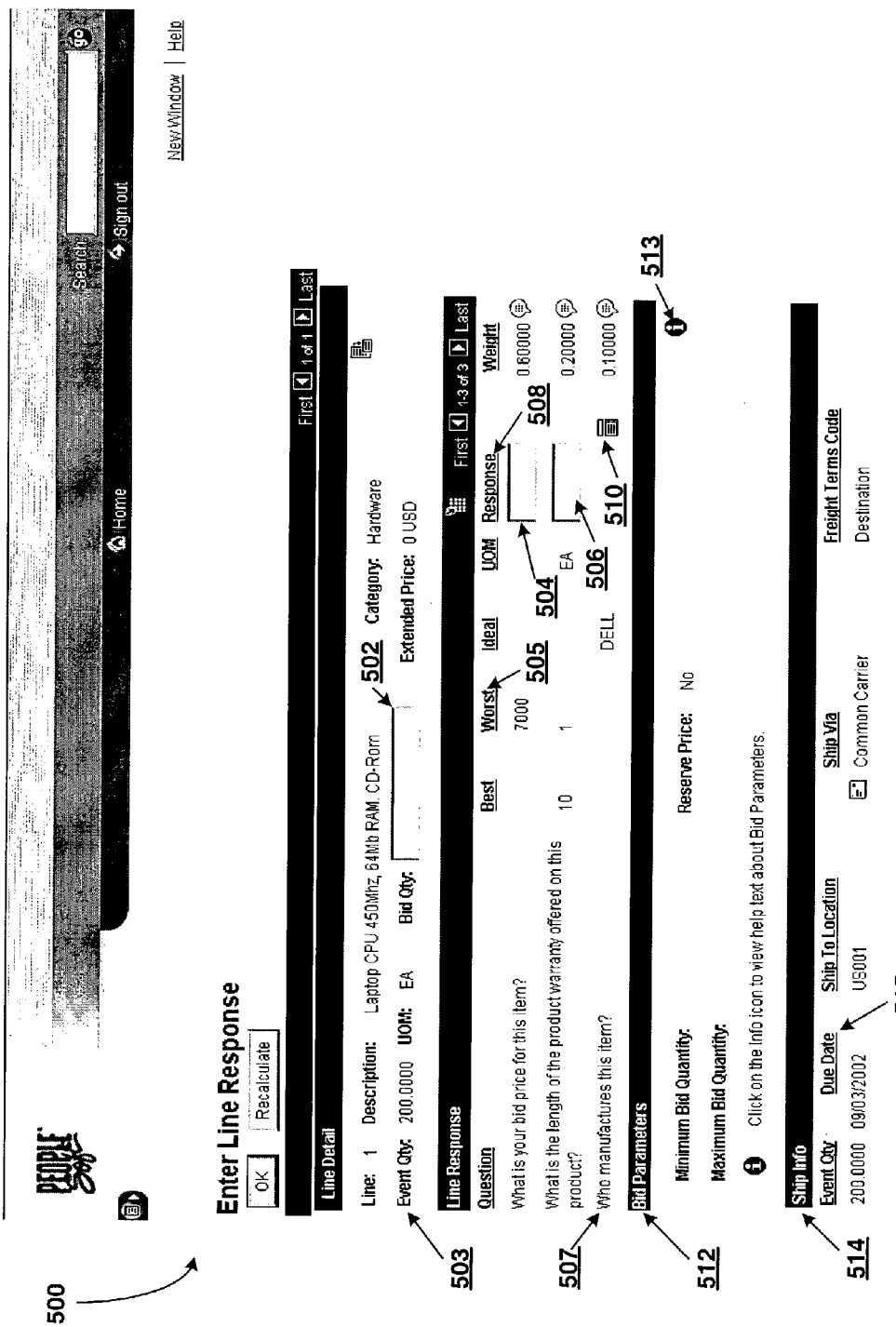
FIG. 5 is a screen shot showing an exemplary supplier response page in accordance with an embodiment of the invention.

Referring now to FIG. 5, a screen shot showing an exemplary supplier response page is shown in accordance with an embodiment of the invention. Once the supplier has been invited to bid on a sourcing event, the supplier may choose the sourcing event for which the supplier wants to enter a bid, as discussed herein. Once the supplier chooses the particular sourcing event, a response page appears, such as the response page shown in FIG. 5, allowing the supplier to enter response data related to the bid. The exemplary response page shown in FIG. 5 is related to a "Laptop" computer sourcing event.

As indicated in FIG. 5, the supplier is asked to enter a bid quantity in the bid quantity response field 502. The responses may be entered by the supplier or any user, such as a representative of the supplier, a customer service department of the consumer taking the bid information over the telephone, etc. As shown, numerous sourcing event details are included in order to guide the supplier in structuring the bid. For example, the number of laptops required by the consumer is indicated as 200, labeled as "Event Qty:" 503.

Bid price response field 504 is for the supplier to identify the price for which the supplier will supply the quantity of laptops specified in bid quantity response field 502. As shown, the bid price is worth 60% of the overall bid, with $7000 per laptop being the worst bid price 505. As discussed herein, a query, weight, and points value represent the metric, which in FIG. 5 is the bid price metric. The consumer may allow the supplier to see the weight and any points value established with respect to the metric, or the consumer may hide these from the supplier. The weight, and/or points value may be changed by the consumer at any time, including after all bids have been received. The query may also be changed by the consumer.

As shown in FIG. 5, product warranty response field 506 is included for allowing the supplier to enter the length of the product warranty offered on the laptops. The consumer has also created a manufacturer metric, including a query asking the supplier to identify "who manufactures this item?" 507. Icon 510 is utilized to view the selections available in response to the query "who manufactures this item?" 507. Accordingly, the supplier can select a manufacturer from a list of manufacturers provided via the icon 510.

Bid parameters 512 section of the response page 500 provides information related to the bid quantity, as shown. For example, the consumer may specify a minimum, a reserve price, and a maximum bid quantity. The consumer may display any metrics in this section. Help icon 513 provides help information related to items displayed in the bid parameters 512 section. For instance, definitions of minimum bid quantity, maximum bid quantity, and reserve price may be provided via the help icon 513.

Shipping information section 514 sets forth shipping details for the supplier. Although shipping information section 514 in FIG. 5 displays consumer specified shipping data, the consumer may create shipping information section 514 as a metric. For instance, the consumer may create a query asking the supplier for a delivery date, rather than specifying due date 516, as shown in FIG. 5. Furthermore, the consumer may establish a points value and weight related to shipping information in order to allow the shipping information provided by the supplier to be considered during the analysis stage. Once the supplier has entered response data, the consumer can rate the consumer by analyzing the response data according to the points value and the weight established.

Referring now to FIG. 6, a screen shot showing an exemplary analysis page 600 in accordance with an embodiment of the invention is shown. Sort bids section 602 allows the consumer to specify how the bids are sorted and in what order the bids are sorted. In other words, the consumer may choose a particular display configuration utilizing sort bids section 602. Analysis section 604 indicates the response data entered by the supplier, as well as the total score or rating for the particular supplier.

As discussed herein, the consumer can utilize the rating or score for the supplier in order to select the supplier(s) for a particular project. The consumer can select the supplier based on the highest score or rating, by taking the relative scores into consideration, etc. The consumer can simply regard the score as one of many factors the consumer considers in determining which supplier(s) to use.

Award section 606 is part of analysis section 604. Award section 606 allows the consumer to enter information regarding terms consistent with selecting a particular supplier with respect to supplying the item, service, etc. set forth by the sourcing event. For instance, in FIG. 6, the consumer may enter whether the supplier was awarded the event, and if so, what percentage of the total event was awarded to the supplier as well as what quantity was awarded to the particular supplier. For instance, the supplier may be awarded 50% of a contract for supplying laptops and may accordingly be slated to supply 100 laptops.

In one embodiment, the consumer may save the analysis of the sourcing event for future retrieval. For example, the consumer may choose to access the analysis page in which a particular supplier was awarded all or a portion of an event in order to determine what bearing that award may have on a current sourcing event. Further, the consumer may choose to access several analysis pages related to the particular supplier in order to determine the average percentage of contracts awarded to the particular supplier, or any other statistic.

Factors section 608 allows the consumer to enter information about the supplier. For instance, the consumer may enter information related to whether the consumer has done business with the particular supplier in the past. This metric, as with any other metric, may be hidden from the supplier, or shown to the supplier without a response field. Alternatively, the consumer may choose to allow the supplier to enter this type of information. The consumer may also change the weights and or points values established for the metrics in factors section 608. Once the consumer has entered or modified information, ratings assigned to the suppliers may be recalculated, as discussed herein.

In FIG. 6, the metric for prior business dealings is represented by a simple yes ("Y") 610 or no. Thus, if the supplier has done business with the consumer on prior occasions, the supplier receives the full 10% weighted value 612, but receives 0% of the weighted value if no prior business has been conducted with the consumer. However, the consumer may establish more detailed points values. For example, the consumer may rate prior business dealing experiences with the particular supplier based on a scale from 1 to 10. The consumer may also give credit to the supplier based on the number of prior business dealings, etc. Any type of metric, as well as any level of detail for a particular metric may be established according to the invention.

A variety of features and metrics may be included in association with the sourcing event. For example, the consumer may utilize an effective dating feature, which allows the consumer to future-date changes to metrics. For example, if a policy change is scheduled to occur on Jan. 1, 2003, the consumer can insert a new row dated Jan. 1, 2003 including a revised query, a different metric weight, etc. In one embodiment, the consumer may save an analysis page and recalculate scores of suppliers based on the future-date changes to metrics.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for identifying sourcing event metrics for analyzing a supplier, comprising:
    a metric identification engine of a consumer computing device selecting a first previously created sourcing event, wherein two or more predefined metrics are associated with the previously created sourcing event;
    the metric identification engine of the consumer computing device providing a comment field and receiving comments related to a metric from the supplier;
    the metric identification engine of the consumer computing device populating a new sourcing event with the two or more predefined metrics, each predefined metric operable to trigger a response from a potential supplier;
    the metric identification engine of the consumer computing device further populating the new sourcing event with a second previously created sourcing event, wherein the second previously created sourcing event is used as a predefined metric of the first previously created sourcing event;
    the metric identification engine of the consumer computing device modifying one or more of the predefined metrics;
    the metric identification engine of the consumer computing device determining a weighting factor predefined for one or more of the predefined metrics;
    for each predefined metric having a fixed set of possible responses, the metric identification engine of the consumer computing device determining a points value predefined for one or more possible responses;
    the metric identification engine of the consumer computing device redefining a points value for one or more of the predefined metrics;
    for each predefined metric providing for a comment field, the metric identification engine of the consumer computing device assigning a points value to one or more keywords appearing in the comment field before receiving a response to the new sourcing event;
    a metric evaluation engine of the consumer computing device determining whether previously obtained data associated with the predefined metrics exists for each of a plurality of potential suppliers, and for each potential supplier:
        the metric evaluation engine of the consumer computing device pre-populating a response field associated with each of the predefined metrics where previously obtained data exists for that predefined metric,
        the metric evaluation engine of the consumer computing device querying the potential supplier for response data associated with the predefined metrics,
        the metric evaluation engine of the consumer computing device receiving a second set of response data in response to the query, the metric evaluation engine of the consumer computing device determining the points values earned for each of the predefined metrics based upon the second set of response data, the metric evaluation engine of the consumer computing device multiplying the points values for each of the predefined metrics by the weighting factor for the respective predefined metric to generate a weighted points value for each predefined metric, and the metric evaluation engine of the consumer computing device summing the weighted points values to generate an overall point total; and the metric evaluation engine of the consumer computing device ranking each supplier based on the overall point total and displaying the ranking to a user, whereby the user is able to select a supplier based on the ranking.

2. The method of claim 1, wherein the previously obtained data is obtained from a database.

3. The method of claim 1, further comprising:
adding one or more ad hoc metrics to the new sourcing event;
creating a query for each of the one or more ad hoc metrics;
creating a points value for one or more potential responses for each of the one or more ad hoc metrics; and
creating a weight for one or more of the ad hoc metrics.

4. The method of claim 1, further comprising querying the supplier to determine whether the supplier wishes to modify the pre-populated response field.

5. The method of claim 1, wherein the previously obtained data is obtained from a registration process for the new sourcing event.

6. A system for identifying sourcing event metrics for analyzing a supplier, comprising:
a consumer computing device for identifying a sourcing event and for querying potential suppliers, the consumer computing device operable to select a first previously created sourcing event and a second previously created sourcing event, wherein two or more predefined metrics are associated with the first previously created sourcing event;
a database for storing two or more predefined metrics associated with new sourcing event;
a metric identification engine of the consumer computing device for populating a new sourcing event with the predefined metrics, each predefined metric operable to trigger a response from a potential supplier, and the second previously created sourcing event, wherein the second previously created sourcing event is used as a predefined metric of the first previously created sourcing event, the metric identification engine of the consumer computing device further programmed to:
determine a weighting factor predefined for one or more of the predefined metrics,
for each predefined metric having a fixed set of possible responses, determine a points value predefined for one or more possible response,
provide a comment field and receive comments related to a metric from the supplier;
for each predefined metric providing for the comment field, assign a points value to one or more keywords appearing in the comment field before receiving a response to the new sourcing event,
redefine a points value for one or more of the predefined metrics; and
a metric evaluation engine of the consumer computing device for determining whether previously obtained data associated with the predefined metrics exists for each of a plurality of potential suppliers, and for each potential supplier:
pre-populate a response field associated with each of the predefined metrics where previously obtained data exists for that predefined metric,
query the potential supplier for response data associated with the predefined metrics,
received a second set of response data in response to the query,
determine the points values earned for each of the predefined metrics based upon the response data,
multiply the points values for each of the predefined metrics by the weighting factor for the respective predefined metric to generate a weighted points value for each predefined metric,
sum the weighted points values to generate an overall point total, and
rank each supplier based on the overall point total and displaying the ranking to a user, whereby the user is able to select a supplier based on the rank.

7. The system of claim 6, wherein determining the weighting factor includes accepting a weighting factor predefined for one or more of the predefined metrics.

8. The system of claim 7, wherein determining the weighting factor includes modifying the weighting factor predefined for one or more of the predefined metrics.

9. The system of claim 6, further comprising creating a weighting factor to associate with one or more of the predefined metrics.

10. The system of claim 6, wherein determining the points value includes accepting a points value predefined for one or more the predefined metrics.

11. The system of claim 10, wherein determining the points value includes modifying the points value predefined for one or more the predefined metrics.

12. The system of claim 6, further comprising creating at least one new points value to associate with the predefined metrics.

13. The system of claim 6, wherein the query for the response data is a query automatically associated with the predefined metrics.

14. The system of claim 6, wherein the metric evaluation engine further comprises logic for adjusting, after receiving the response data, at least one of the weighting factor and the points value for at least one of the predefined metrics in order to change the ranking 15. The system of claim 6, wherein the metric identification engine further comprises logic, the logic operable to:
add one or more ad hoc metrics to the new sourcing event;
create a query for each of the one or more ad hoc metrics;
create a points value for one or more potential responses for each of the one or more ad hoc metrics; and
create a weight for one or more of the ad hoc metrics.

16. The system of claim 15, wherein the consumer computing device further comprises logic for querying the supplier for response data to the ad hoc metrics.

17. The system of claim 15, wherein the consumer computing device further comprises logic for saving the ad hoc metrics to the new sourcing event.

18. A computer-readable medium having stored thereon instructions causing a consumer computing device to execute a method for identifying sourcing event metrics for analyzing a supplier, the method comprising the steps of:
selecting a first previously created sourcing event, wherein two or more predefined metrics are associated with the previously created sourcing event;

providing a comment field and receiving comments related to a metric from the supplier;

populating a new sourcing event with the two or more predefined metrics, each predefined metric operable to trigger a response from a potential supplier;

populating the new sourcing event with a second previously created sourcing event, wherein the second previously created sourcing event is used as a predefined metric of the first previously created sourcing event;

modifying one or more of the predefined metrics;

determining a weighting factor predefined for one or more of the predefined metrics;

for each predefined metric having a fixed set of possible responses, determining a points value predefined for one or more possible responses;

redefining a points value for one or more of the predefined metrics;

for each predefined metric providing for a comment field, assigning a points value to one or more keywords appearing in the comment field before receiving a response to the new sourcing event;

determining whether previously obtained data associated with the predefined metrics exist for each of a plurality of potential suppliers, and for each potential supplier:

- pre-populating a response field associated with each of the predefined metrics where previously obtained data exists for that predefined metric,
- querying the potential supplier for response data associated with the predefined metrics,
- receiving a second set of response data in response to the query,
- determining the points values earned for each of the predefined metrics based upon the second set of response data,
- multiplying the points values for each of the predefined metrics by the weighting factor for the respective predefined metric to generate a weighted points value for each predefined metric, and
- summing the weighted points values to generate an overall point total; and ranking each supplier based on the overall point total and displaying the ranking to a user, whereby the user is able to select a supplier based on the ranking.

* * * * *

UNITED STATES PATENT AND TRADEMARK OFFICE
CERTIFICATE OF CORRECTION

| | | |
|---|---|---|
| PATENT NO. | : 7,778,864 B2 | Page 1 of 1 |
| APPLICATION NO. | : 10/320941 | |
| DATED | : August 17, 2010 | |
| INVENTOR(S) | : Michelle Conrad et al. | |

It is certified that error appears in the above-identified patent and that said Letters Patent is hereby corrected as shown below:

Title Page,
On page 2, in column 2, under "Other Publications", line 23, delete "Propsals" and insert -- Proposals --, therefor.

In column 16, line 47, in claim 14, after "ranking" insert -- . --.

Signed and Sealed this
Tenth Day of May, 2011

David J. Kappos
*Director of the United States Patent and Trademark Office*